US012030459B2

(12) United States Patent
Sutter

(10) Patent No.: US 12,030,459 B2
(45) Date of Patent: Jul. 9, 2024

(54) BOAT TRAILER STAIR SYSTEM

(71) Applicant: James D. Sutter, LaBelle, FL (US)

(72) Inventor: James D. Sutter, LaBelle, FL (US)

( * ) Notice: Subject to any disclaimer, the term of this patent is extended or adjusted under 35 U.S.C. 154(b) by 561 days.

(21) Appl. No.: 17/396,982

(22) Filed: Aug. 9, 2021

(65) Prior Publication Data
US 2022/0041111 A1  Feb. 10, 2022

Related U.S. Application Data

(60) Provisional application No. 63/062,810, filed on Aug. 7, 2020.

(51) Int. Cl.
*B60R 3/00* (2006.01)
*B60P 3/10* (2006.01)

(52) U.S. Cl.
CPC ............ *B60R 3/00* (2013.01); *B60P 3/1033* (2013.01)

(58) Field of Classification Search
CPC .................................. B60R 3/00; B60P 3/1033
See application file for complete search history.

(56) References Cited

U.S. PATENT DOCUMENTS

| | | | | |
|---|---|---|---|---|
| 1,115,803 A * | 11/1914 | Gallagher | ................. | E06C 1/39 182/27 |
| 4,094,527 A * | 6/1978 | Miller | ................... | B60P 3/1033 414/559 |
| 4,146,941 A * | 4/1979 | Haslam | ................... | E06C 1/381 182/91 |
| 5,046,582 A * | 9/1991 | Albrecht | ................... | B60R 3/02 182/127 |
| 5,238,324 A * | 8/1993 | Dettling, Jr. | ............. | B63C 3/06 405/220 |
| 5,687,813 A * | 11/1997 | Bensch | ................... | B60R 3/007 182/127 |
| 5,896,946 A * | 4/1999 | Brackett | ............... | B60P 3/1066 182/127 |
| 5,899,656 A * | 5/1999 | Rahe | ........................ | B60P 3/08 410/24 |
| 6,003,633 A * | 12/1999 | Rolson | ..................... | E06C 5/02 182/127 |
| 6,575,487 B1 * | 6/2003 | Krause | .................. | B60P 3/1033 280/43.23 |
| 6,578,666 B1 * | 6/2003 | Miller | ....................... | E06C 1/36 182/127 |
| 6,932,193 B2 * | 8/2005 | Tombarello | ............. | B63B 27/14 182/127 |
| 6,942,271 B1 * | 9/2005 | Jamison | .................. | B60R 3/007 296/61 |

(Continued)

*Primary Examiner* — Jacob B Meyer
(74) *Attorney, Agent, or Firm* — William E Noonan

(57) ABSTRACT

A boat trailer stair system is provided for facilitating access to a boat supported by a trailer. The system includes an A-frame configured stairway having interconnected forward and rearward frame sections that angularly diverge from top to bottom for positioning adjacent to a vessel supported on the boat trailer. The upper ends of the frame sections are interconnected and the diverging lower ends are fastened to longitudinally spaced apart locations on a longitudinal beam of the boat trailer. At least one of the frame sections supports a plurality of steps that ascend the frame section adjacent to the hull of a supported vessel. A pair of interconnected stairways may be mounted to the trailer on respective sides of the supported boat.

15 Claims, 8 Drawing Sheets

(56) References Cited

U.S. PATENT DOCUMENTS

| | | | | |
|---|---|---|---|---|
| 7,025,174 B1* | 4/2006 | Hawley | B60R 3/02 | 182/127 |
| 7,100,740 B2* | 9/2006 | Newton | E06C 5/04 | 182/95 |
| 7,240,947 B2* | 7/2007 | Kuznarik | B62D 33/0273 | 296/62 |
| 7,410,031 B2* | 8/2008 | Jensen | E06C 5/02 | 182/127 |
| 7,516,997 B2* | 4/2009 | Kuznarik | B62D 33/0273 | 182/127 |
| 7,574,764 B1* | 8/2009 | Irving | B63C 13/00 | 296/61 |
| 7,628,564 B2* | 12/2009 | Krause | B63C 3/06 | 114/344 |
| 8,322,739 B1* | 12/2012 | Fair | B60P 3/1066 | 280/414.1 |
| 8,539,899 B2* | 9/2013 | Gimpel | B63B 1/121 | 114/61.18 |
| 8,607,930 B2* | 12/2013 | Stewart | E06C 9/06 | 182/95 |
| 8,636,110 B2* | 1/2014 | Ebbenga | E06C 1/383 | 182/127 |
| 8,678,457 B1* | 3/2014 | Duderstadt | B60R 3/00 | 296/1.02 |
| 8,985,660 B1* | 3/2015 | Weber | B60R 3/005 | 296/62 |
| 9,302,719 B1* | 4/2016 | Krishnan | B60R 3/02 | |
| 9,676,318 B2* | 6/2017 | Langenfeld | B60P 3/1075 | |
| 9,839,179 B2* | 12/2017 | Stover | A01D 34/824 | |
| 11,603,026 B2* | 3/2023 | Miller | B60Q 1/24 | |
| 2011/0168491 A1* | 7/2011 | Cheatham, Jr. | E06C 5/24 | 280/166 |
| 2022/0041111 A1* | 2/2022 | Sutter | B60R 3/02 | |
| 2022/0289111 A1* | 9/2022 | Short | B60R 3/02 | |

\* cited by examiner

BOAT TRAILER STAIR SYSTEM

RELATED APPLICATION

This application claims the benefit of Application Ser. No. 63/062,810 filed Aug. 7, 2020.

FIELD OF THE INVENTION

This invention relates to a stair system mounted to a boat trailer, which provides a person with improved secure and convenient access to a boat supported on the trailer.

BACKGROUND OF THE INVENTION

Access to a boat or other marine vessel supported on a trailer is commonly required for tasks such as cleaning the boat, performing necessary repairs and loading or unloading the vessel. Conventionally, climbing into and out of a trailered boat can be problematic. Traditionally, a person accesses the boat by stepping from the trailer frame or rear fender over the hull wall and gunwale, and directly onto the deck of the vessel. Climbing into the boat in this manner can be difficult, if not impossible, when the deck is elevated significantly above the trailer frame. Accordingly, to facilitate access various types of ladders and step systems have been developed. See, for example, U.S. Pat. Nos. 7,100,740, 7,410,031, 8,322,739 and 8,607,930. Such systems nonetheless continue to exhibit various disadvantages. Known ladder and step systems tend to be fairly awkward and inconvenient to use. Often they are mounted on the trailer frame and/or positioned against the supported boat in an unstable manner. The person ascending or descending the ladder or steps may be in danger of slipping, tripping or falling, which can result in a serious injury. In assemblies of the type shown in U.S. Pat. Nos. 7,410,031 and 8,322,739 steps or rungs are positioned below the bow of the vessel. In such cases, it can be difficult for a person attempting to climb out of the boat to clearly see the steps or rungs. Once again, this presents a risk of missteps and falls. Devices such as that shown in U.S. Pat. No. '031 employ a winch driven cable for raising and lowering a ladder. The cable and winch present a tripping hazard.

Virtually all of the known step and ladder systems employed for trailer mounted boats are at least somewhat awkward and annoying to use especially when the trailer is partially submerged on a boat ramp. The ladder rungs or steps themselves may be at least partially submerged and not readily accessible. None of the known devices provides an optimally secure and convenient means for not only climbing into and out of the vessel, but also reliably and expeditiously loading and unloading supplies and equipment onto and off the aft of a trailered boat.

SUMMARY OF THE INVENTION

It is therefore an object of the present invention to provide an improved boat trailer stair system that allows persons to more conveniently, safely and securely access a trailered boat.

It is a further object of this invention to provide a stair system that allows a trailered boat to be quickly, conveniently, reliably and safely accessed by one or more persons for a wide variety of purposes including but not limited to cleaning the vessel, performing needed repairs and loading and unloading equipment, supplies and provisions onto and off of the vessel.

It is a further object of this invention to provide a boat trailer stair system that is positioned, oriented and mounted to the trailer in a much more stable and safer manner than is employed by known boat trailer ladder and step systems and which does not require the user to climb awkwardly and unstably over the bow and/or gunwale of the supported boat.

It is a further object of this invention to provide a boat trailer stair system that is much more versatile than existing systems and which permits users to access a trailered boat from both sides of the vessel and in both fore and aft facing directions.

It is a further object of this invention to provide a boat trailer stair system that is mounted to the underlying trailer frame in an extremely balanced, stable and secure manner so that safer and more reliable access to the trailered boat is provided.

It is a further object of this invention to provide a boat trailer stair system employing an inclined series of steps that extend side to side laterally outwardly from a respective side of the supported vessel so that a person may quickly and conveniently access the deck and interior of the boat without undue hinderance or interference from the vessel, the trailer or other surrounding marine accessories.

This invention features boat trailer stair system for providing persons with access to a vessel mounted on the boat trailer. The stair system includes a generally A-frame configured stairway having interconnected and angularly diverging forward and rearward, oppositely inclined stair sections positioned adjacent to the hull of a boat supported on the trailer. The frame sections are joined at an upper end or apex of the stairway and diverging lower ends of the stair sections are mounted to a longitudinal beam of the trailer at respective, longitudinally spaced-apart locations on the beam. At least one of the inclined stair sections includes a plurality of steps that are arranged and configured to ascend the inclined stair section beside the hull of the trailer supported vessel in a direction generally parallel to the trailer beam and a longitudinal axis of the vessel supported of the trailer.

In a preferred embodiment, each of the forward and rearward inclined stair sections may include a spaced apart pair of inner and outer stringers. Each of the forward and rearward stair sections may include at least one step, and preferably a plurality of steps extending side to side between the spaced apart pair of stringers. The rearward and the forward frame sections may each carry three steps. A handle or handrail may be attached to and extend upwardly from the apex of the stairway, where the forward and rearward frame sections are joined. At least some of the spaces between successive, ascending steps may be closed by respective filler plates. In alternative versions, the stairway may incorporate a fiberglass or molded construction, which further defines the inclined stair sections and integral steps.

The forward and rearward stair sections are preferably mounted to the longitudinal beam of the boat trailer frame by one or more mounting bars or tubes that extend transversely across the trailer beam. More particularly, each mounting bar may be fastened proximate a lower end of a respective one of the forward and rearward stair sections. In versions employing inner and outer stringers, a respective mounting bar may be connected to both the inner and outer stringers of each stair section. In turn, the mounting bar may be attached to the longitudinal trailer beam by a respective mounting clamp. The mounting bars may be mounted either above or below the longitudinal beam.

It is especially preferred that a pair of interconnected A-frame stairways, as previously described, be supported on the trailer adjacent to respective sides of the supported boat's hull. A forward mounting bar may extend across a pair of longitudinal beams of the boat trailer for interconnecting respective forward stair sections of stairways positioned on opposite sides of the trailer and supported vessel. A rearward mounting bar may likewise be attached to rearward frame sections of the respective step systems. The mounting bars may be secured by clamps or other means to respective longitudinal beams of the trailer. At least one mounting bar may include multiple slidably interengaged tubular pieces that are longitudinally adjustable for widening or narrowing the distance between the interconnected stairways as needed. The mounting bars may be connected to the stairway by brackets, mounting pins and bolts, and other forms of interconnection. The rearward mounting bar may carry a boat trailer roller for engaging the keel of the supported vessel and facilitating launching of the vessel from the trailer into a body of water and later retrieval of the vessel onto the trailer.

In embodiments where the stairway is enclosed, such as when a fiberglass or molded construction is used, an interior compartment may be formed within the stair system. A door may be formed in the stairway, which provides access into the compartment for storing marine items and supplies as needed.

BRIEF DESCRIPTION OF THE DRAWINGS

Other objects, features and advantages will occur from the following description of a preferred embodiment and the accompanying drawing, in which.

DETAILED DESCRIPTION OF PREFERRED EMBODIMENTS

Figure 1:
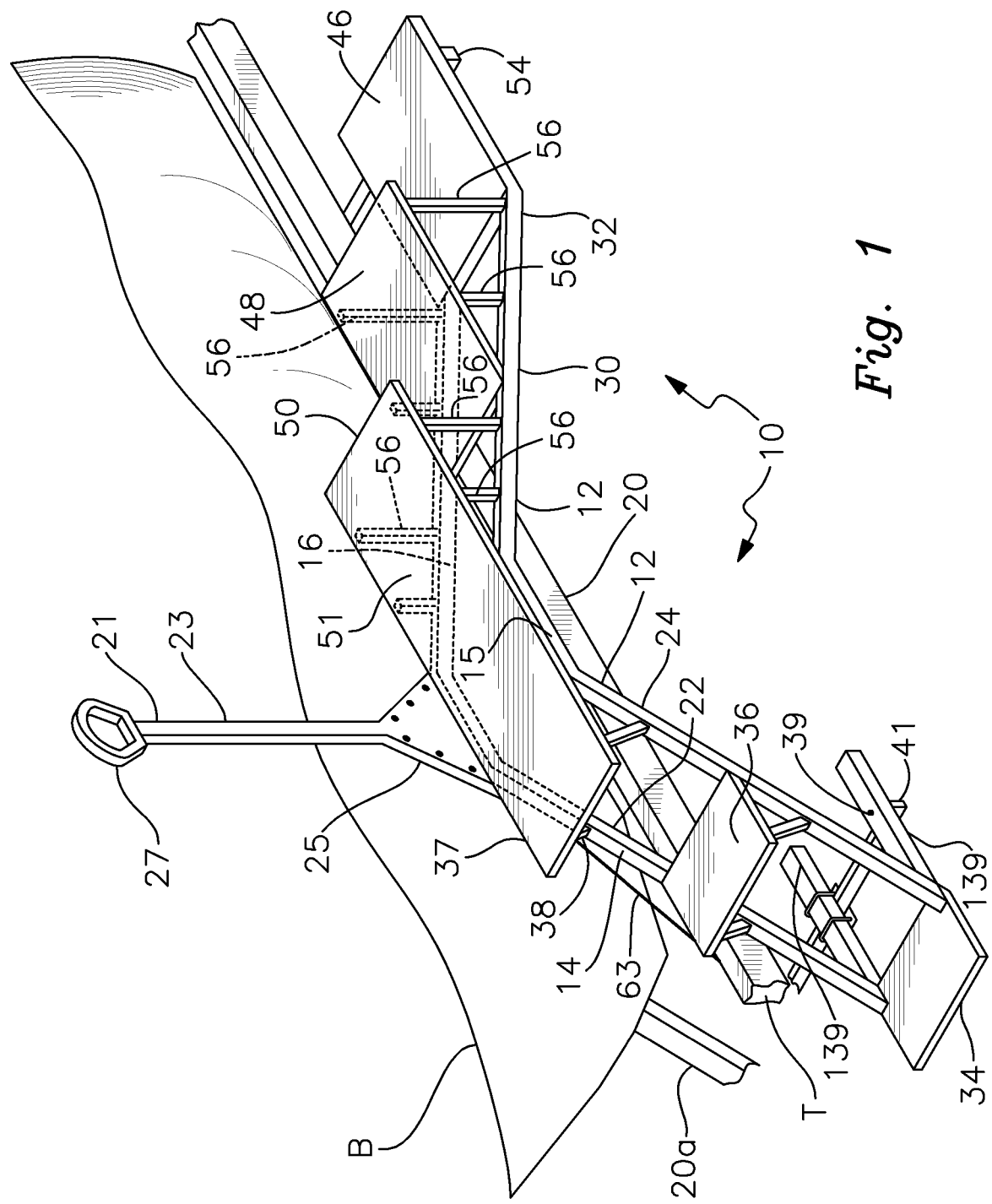
FIG. 1 is a perspective front view of a preferred boat trailer stair system in, accordance with this invention and depicting a representative stairway used in the system.

There is shown in FIG. 1 a boat trailer stair system 10 that provides significantly improved access for a user needing to climb into or out of, or otherwise access a boat B mounted on a boat trailer T. Stair system 10 may be utilized for many various types of boats and boat trailers. The particular construction of boat B and trailer T, as well as the particular applications and environments in which system 10 may be utilized should not be construed as limitations on this invention. Likewise, stair system 10 may be employed within the scope of this invention for assorted makes and models of boats and boat trailers.

Figure 2:
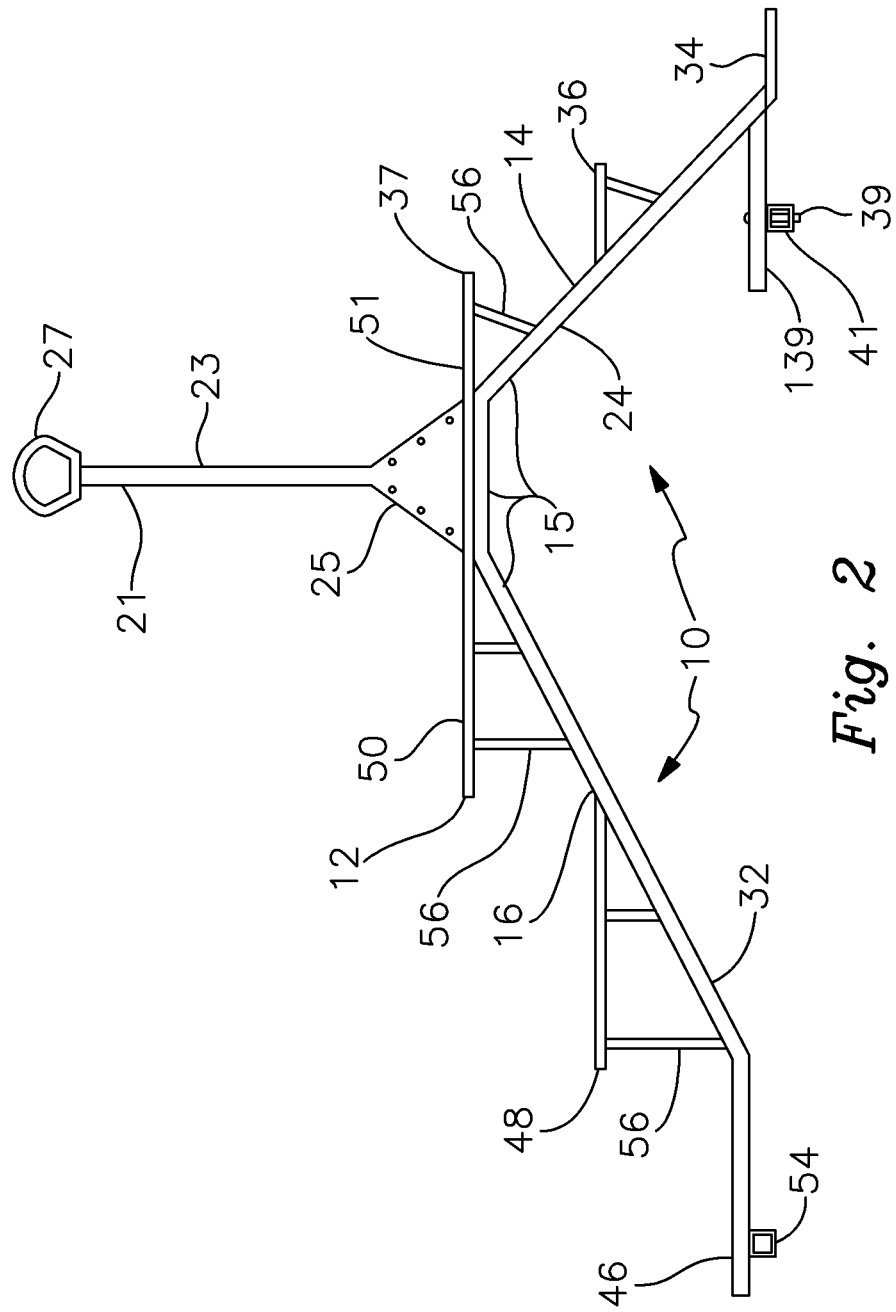
FIG. 2 is a side elevational view of the stairway of FIG. 1.
Figure 3:
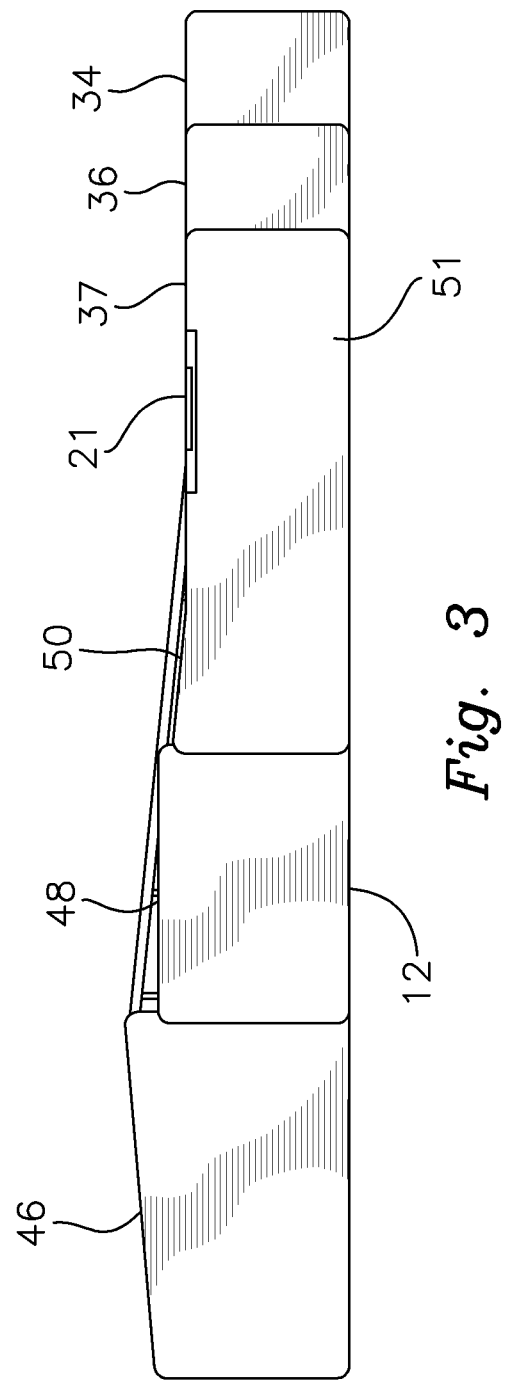
FIG. 3 is a top view of the stairway of FIGS. 1 and 2.
Figure 4:
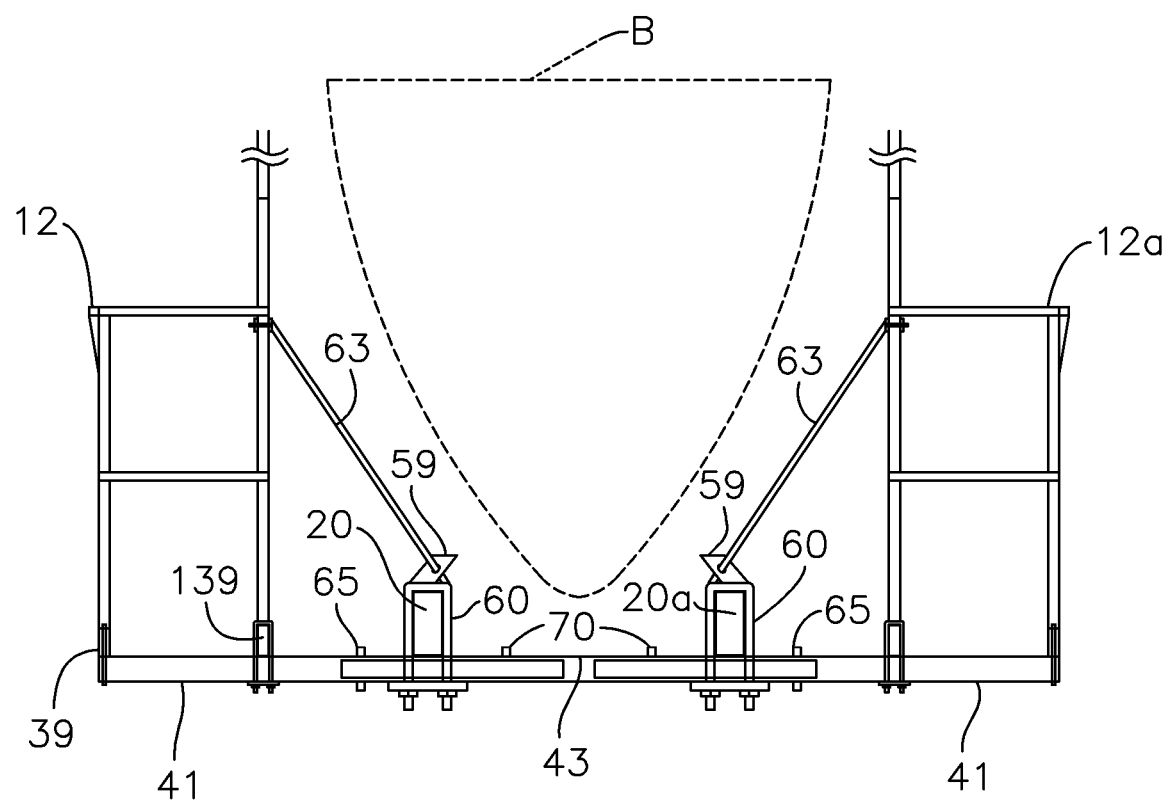
FIG. 4 is an elevational rear cross sectional view of the preferred stair system featuring a pair of stairways in accordance with FIGS. 1-3 and employing a preferred means for adjustably mounting the front ends of the stairways to the trailer frame.
Figure 8:
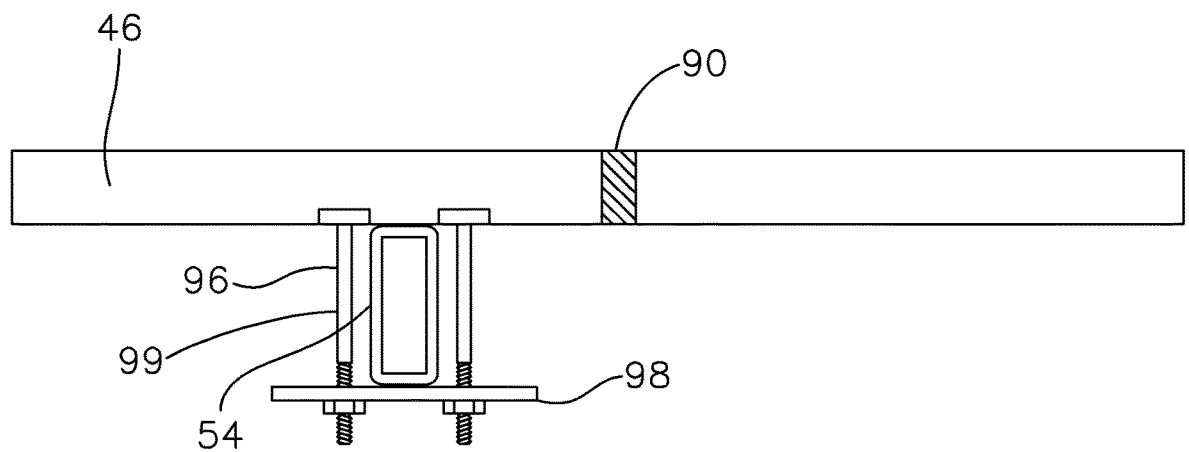
FIG. 8 is an elevational side view of the bracket for attaching the adjustable rearward mounting tube to the rear step.

Stair system 10 features a stairway 12 having a generally A-frame configuration. A second interconnected stairway 12a, shown in FIGS. 2-4, is preferably mounted on the opposite side of trailer T (i.e. stairway 12 is positioned on the port side of supported boat B and stairway 12a is positioned on the starboard side of the vessel). Otherwise, stairways 12 and 12a are constructed analogously to one another and the respective elements of each stairway are assigned like reference numbers herein. Each stairway 12, 12a includes an inclined forward stair section 14 and an oppositely inclined rearward stair section 16 that typically comprise strong, durable and water resistant metal frame components such as 1"×1½", 16 gauge rectangular tubing or ¾" angle iron. Other specifications may be employed for these and other components of the stairway within the scope of this invention. Stair sections 14 and 16 are interconnected by a parallel pair of horizontal frame components 15 (only the outer one of which is visible in the drawings) at the apex 18 of stairway 12, 12a. The forward and rearward inclined sections 14, 16 diverge from top frame components 15 to opposite lower ends. The lower end of each stair section 14 and 16 is secured to one or both of a pair of longitudinal beams 20, 20a of boat trailer T in a manner as shown in FIGS. 4 and 8, and described more fully below. As previously stated and specified below, second stairway 12a is analogously secured to longitudinal trailer beams 20, 20a on the opposite starboard side of supported boat B.

More particularly, forward stair section 14 includes a pair of generally parallel inner and outer stringers 22 and 24. Rearward stair section 16 likewise includes an inner stringer 30 and an outer stringer 32. Each stringer comprises components such as the tubing or angle irons as described above. Upper frame pieces 15, FIGS. 1 and 2, which may comprise either square tubing or angle iron, as previously described, interconnect the upper ends of inner stringers 22 and 30 to outer stringers 24 and 32 respectively at the apex 18 of the stairway. A handle assembly 21 includes a tubular metal post 23, which carries an ergonomically shaped tubular metal handle grip 27 at its upper end. Post 23 is bolted or otherwise secured to inner frame component 15 at apex 18 by a metal bracket 25 comprising boiler plate and other durable components. Handle grip 27 may be grasped by a user to facilitate access into and out of the supported boat, as described below.

Each pair of parallel stringers supports a plurality of steps. Specifically, stringers 22 and 24 of forward stair section 14 support a lower step 34, an intermediate step 36 and an upper step 37 (see FIGS. 1-3). Each of steps 34, 36, 37 may include a square tube frame that supports an attached ⅛" polished aluminum boiler plate panel. Intermediate step 36 and upper step 37 may comprise ½"×½" Square Tubing and May be Reinforced by Braces 38 interconnected to stringers 22 and 24. Lower step 34 may comprise a thicker ¾"×¾" square tube frame that supports a respective boiler plate panel. In alternative versions the upper surfaces of the steps may be carpeted. The respective connections between the step frames, braces and stringers may be made by welding or using strong and durable fasteners known to persons skilled in the art. Metal filler (i.e. boiler) plates may also be supported by stair section 14 between respective steps 34, 36 and 37.

A pair of rectangular tubular support braces 139 are attached to and extend rearwardly from respective stringers 22, 24 of forward stair section 14. A transverse mounting tube 41 is attached to inner support brace 139 by a bracket comprising a pair of U-bolts that wrap over brace 139 and fasten to a plate beneath tube 41. A bolt 39 fastens outer brace 139 to a distal end of tube 41. Each stairway 20, 20a is attached to and supported by a mounting tube 41. A single unitary tube or two respective mounting tubes may be employed.

Rearward stair section 16 supports an extended lower step 46, an intermediate step 48 and an upper step 50. Lower step 46 is interconnected between stringers 30 and 32 and is further attached to an underlying 1"×1½" rectangular tube mounting bar 54 as described below. Analogous to the forward steps 34, 36 and 37, steps 46, 48 and 50 of the rearward stair section are supported by stringers 30 and 32 and are further supported and properly angled relative to the stringers by respective braces 56. Solid bars, beams and other strong and durable structural elements may be employed in lieu of the mounting tubes disclosed herein.

As best shown in FIGS. 1-3, upper steps 37 and 50 of stair sections 14 and 16 respectively are typically integrally joined to define an upper platform 51 extending across apex 18 of each stairway 12, 12a. As previously described, the platform includes a square (½"×½") peripheral tube frame and attached boiler plate secured to horizontal frame components 15. Handle assembly 21 is attached to obscured inner horizontal frame component 15 and extends upwardly from platform 51. This provides platform 51 with a wide and readily accessible supportive upper surface for facilitating entry onto and departure from an adjoining vessel supported on the trailer. Platform 51 also provides a convenient surface for supporting items being loaded onto or off of the supported boat.

Mounting tubes 41 and 54 are secured to the trailer in the manner best shown in FIGS. 1 and 4-8. As best shown in FIGS. 1 and 4, the forward mounting tube 41 is attached to forward stair section 14 in the manner described above and extends laterally across and below beam 20. The opposite inner end of each mounting tube 41 is slidably and telescopically received in a respective end of 1½"×2" tubular mounting sleeve 43. Sleeve 43 and the telescopically received mounting tubes 41 extend laterally across and below longitudinal trailer beams 20, 20a and are attached to the trailer beams by U-bolt clamp assemblies 60. Each assembly 60 is positioned proximate a respective end of sleeve 43 and includes a pair of U-bolts engaging a respective beam 20, 20a and attached to a supportive plate underlying sleeve 43.

An L-bracket 59 is fastened to the upper end of each clamp assembly 60. A level adjusting rod 63 interconnects bracket 59 with a respective inside stringer 22 of each forward stair section 14.

Figure 5:
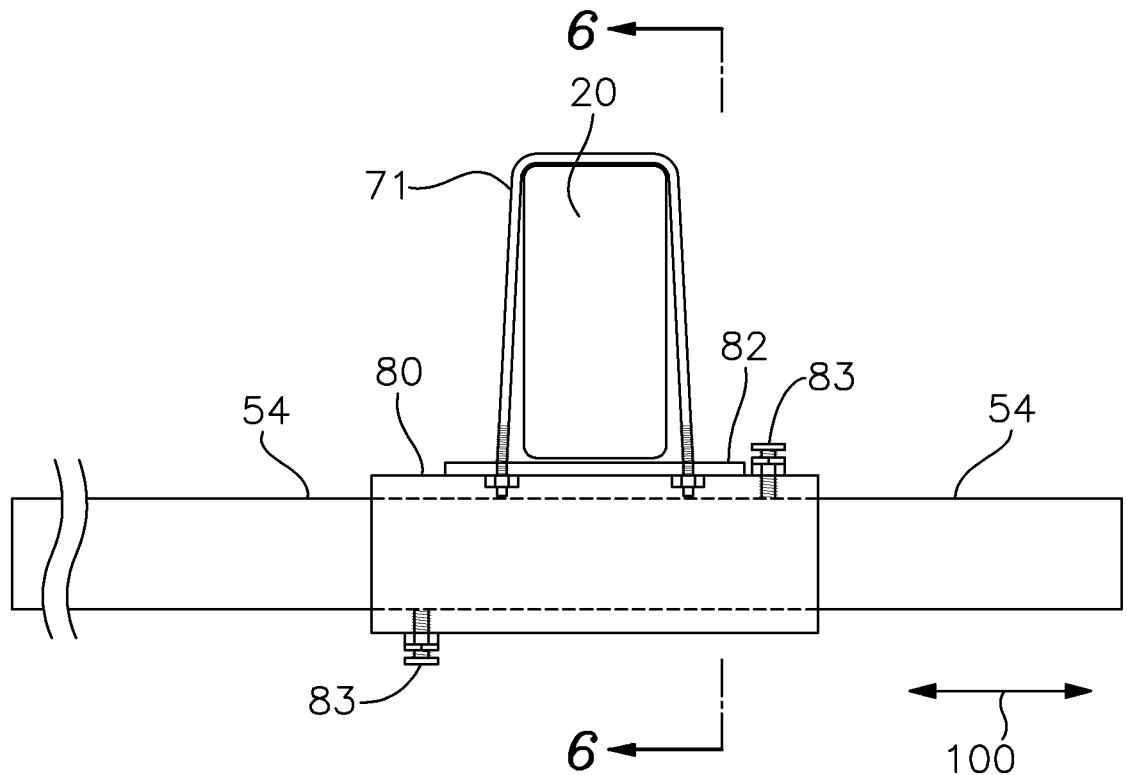
FIG. 5 is a front elevational and cross sectional view of the rearward mounting tube slidably interengaged with the adjustment sleeve supported by the trailer beam for adjustably mounting a rearward end of the stairway to the trailer frame.
Figure 6:
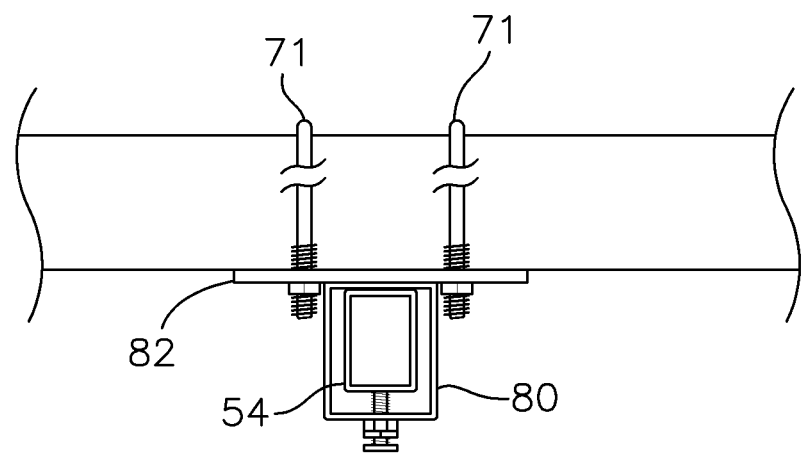
FIG. 6 is a cross sectional view taken along line 6-6 of FIG. 5 of the rearward mounting tube attached to the trailer frame by and slidably adjustable through the adjustment sleeve.

As shown in FIGS. 5, 6 and 8, a rearward mounting tube 54 extends laterally beneath each beam 20 and 20a. In some versions (i.e. those used for smaller trailers), a single tube 54 may be used to interconnect the stairways 12 and 12a of system 10 on respective sides of the supported boat. In other larger trailer versions, a distinct and separate mounting tube may be used for each opposing rearward stair section on respective sides of the trailer.

Mounting tube 54 comprises a 1"×1½", 3/16" thick rectangular tube that is rectangularly slidably mounted in a 1½"×2", 3/16" thick rectangular adjustment sleeve 80. Sleeve 80 is attached to a plate 82, which is, in turn, supported by clamp 71 comprising a pair of U-bolts mounted over trailer beam 20, 20a and attached to a plate 82 to which sleeve 80 is welded or otherwise secured.

Figure 7:
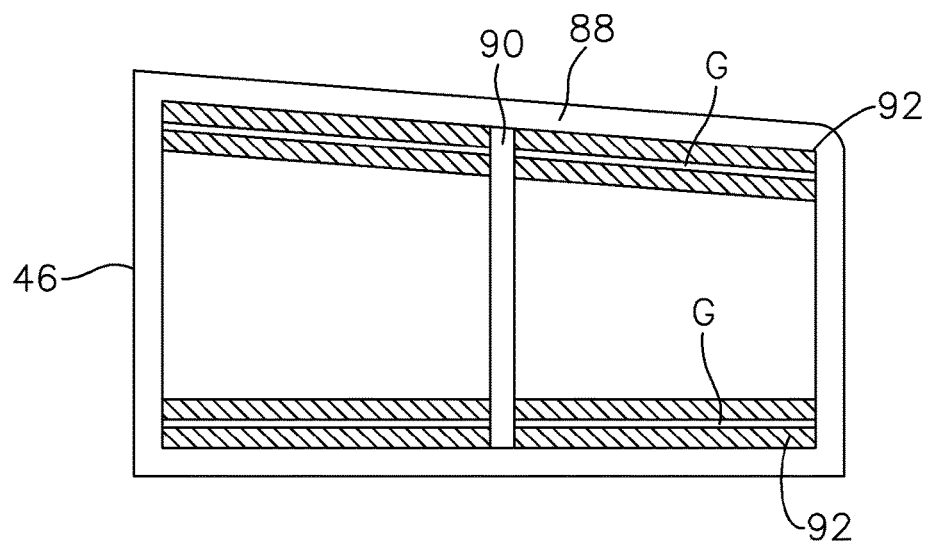
FIG. 7 is a bottom view of a rear step of the stair system employing a structure that permits the stairway to be adjusted forwardly and rearwardly relative to the boat trailer.

At its distal end, mounting tube 54 is secured to a rearward end of stairway 12, 12a in a manner such as shown in FIGS. 7 and 8. As specifically shown in FIG. 7 the lower step of rearward stair section 16 includes a peripheral frame 88 having a strengthening center brace 90 extending transversely therethrough. A spaced apart pair of adjacent angle iron segments 92 are formed along each longitudinal side of peripheral frame 90. A gap G of approximately 7/16" is formed between the two angle iron pieces 92 on each side. As shown in FIG. 8 each gap G slidably receives the bolt heads of a pair of support bolts 96. Each of the bolts 96 is attached by a nut to an underlying plate 98, which effectively forms a bracket 99 for receiving the mounting tube 54 and supporting a distal end of that tube beneath step 46.

The foregoing construction allows both the lateral width and longitudinal positioning of the stair system 10 to be conveniently adjusted in order to accommodate different sizes of trailers, trailer beams and supported vessels. For example, the rearward mounting tube may be adjusted longitudinally as indicated by double headed arrow 100 in FIG. 5 in order to adjust the lateral position of a rearward portion of the stair system to conform to the width of the trailer/hull. By the same token, the longitudinal positioning of the rear step and therefore the entire stair system can be simply adjusted by sliding the U-bolt clamp 71 and the supported adjustment sleeve 80 and mounting tube 54 forwardly or rearwardly along the trailer frame as required. Such adjustment causes the bolts 96 of support bracket 99 to be slid through the longitudinal gaps G of step 48. To adjust the width of the rearward end of the stair system mounting tube 54 is slid through sleeve 80 and secured in a selected lateral position by locking bolts 83 that are inserted into corresponding locking holes formed in sleeve 80 and tube 54.

The forward end of the stair system is likewise easily adjusted to accommodate various vessel and trailer widths. Mounting tubes 41, FIG. 4 may be selectively lengthened or shortened by sliding those tubes through sleeve 43. The sleeve and mounting tubes received therein include respective connecting hole arrangements that are selectively aligned and interengaged by set screws or other locking fasteners 70 to adjust and set the overall length of the slidably connected mounting tubes 41 and, as a result, the width between the forward ends of the respective stairways. Each mounting tube or other mounting bar may alternatively have a horizontal hinge in the center, which connects segments of the tube for adjusting the angle of the tube in order to locate the stairway snugly against the boat cap.

In operation, stairways 12 and 12a are secured to respective ends of mounting tubes 41 and 54 in the manner shown or using alternative types of brackets, pins, clamps or fasteners. The mounting tubes are positioned such that the forward tube(s) 41 extend(s) across and below the longitudinal beams 20 and 20a of the trailer T at a narrow portion of the trailer proximate the bow of the boat. Rearward mounting tube(s) 54 extend(s) below the beams at a rearward and wider location of the trailer. The lateral length of each mounting tube 41, 54 is adjusted as described and the tubes are then secured to the trailer beams by respective clamps 60 and 71 and locking pins or bolts 70, 83. The stairways are thereby secured in place on the trailer T, either with or without a boat mounted on the trailer. Level adjusting rods 63 and leveling bolts 65 are adjusted, as needed, to compensate for the gap between tubes 41 and sleeve 43 and thereby maintain the stairway in a generally level or plumb condition adjacent the vessel. With stair sections 14, 16 secured to trailer T, the steps and upper platform of the stairway are arranged to ascend uniquely in a direction substantially tangential to the boat's hull and paralleling to the longitudinal axis of the trailer and supported vessel. Access to and from the vessel is thereby greatly facilitated. As used herein, "paralleling" should be understood to indicate that the steps are oriented to ascend the trailer in a direction generally corresponding to or following the orientation of the trailer beam and longitudinal axis of the supported vessel. The stairway ascends adjacent, not transversely, to the supported boat hull.

Figure 10:
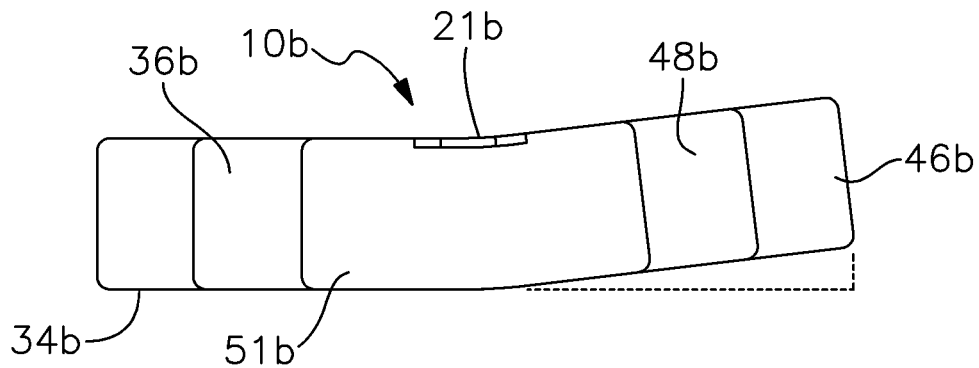
FIG. 10 is a top plan view of the stair system of FIG. 9.
Figure 9:
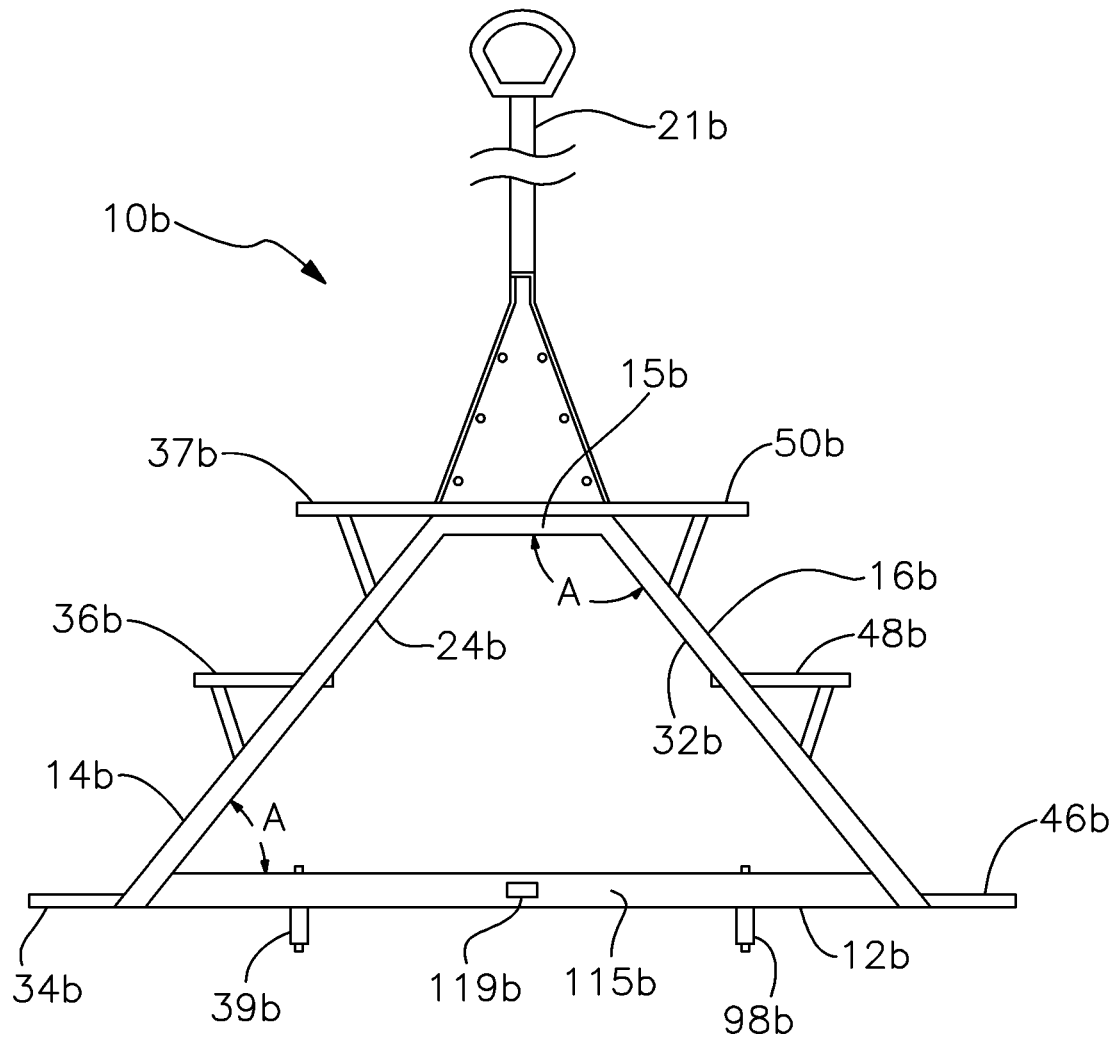
FIG. 9 is an elevational side view of an alternative shorter embodiment of the stair system.

An alternative short trailer stair system 10b is shown in FIGS. 9 and 10. This embodiment is similar to and employs components that are constructed and configured analogously to the components of the previously described embodiment. In particular, stair system 10b includes a stairway 12b having an inclined forward stair section 14b and a rearward stair section 16b. Forward steps 34b, 36b and 37b are attached to a pair of generally parallel stringers 24b (stringer 22b being obscured). Likewise, rearward stair section 16b supports steps 46b, 48b and 50b on a parallel pair of inclined stringers including outer stringer 32b and the obscured inner stringer.

The apex of stairway 12b again includes a horizontal frame portion 15b comprising a pair of generally horizontal and parallel upper frame components. In this embodiment, a lower frame portion 115b interconnects the divergent lower ends of forward and rearward stair sections 14b and 16b.

A handle assembly 21b analogous to that previously described is mounted to the apex of stairway 12b. Upper steps 37b and 50b again define a unitary platform 51b. Lower frame component 115b carries both the front connecting bracket or bolt 39b and a rear connecting bracket 98b which are employed to secure respective mounting tubes to the forward and rearward portions of the stairway in order to securely and adjustably mount the stairway 12b to the trailer frame as previously described. An optional amber running light 119b may be carried by lower frame element 115b.

Figure 11:
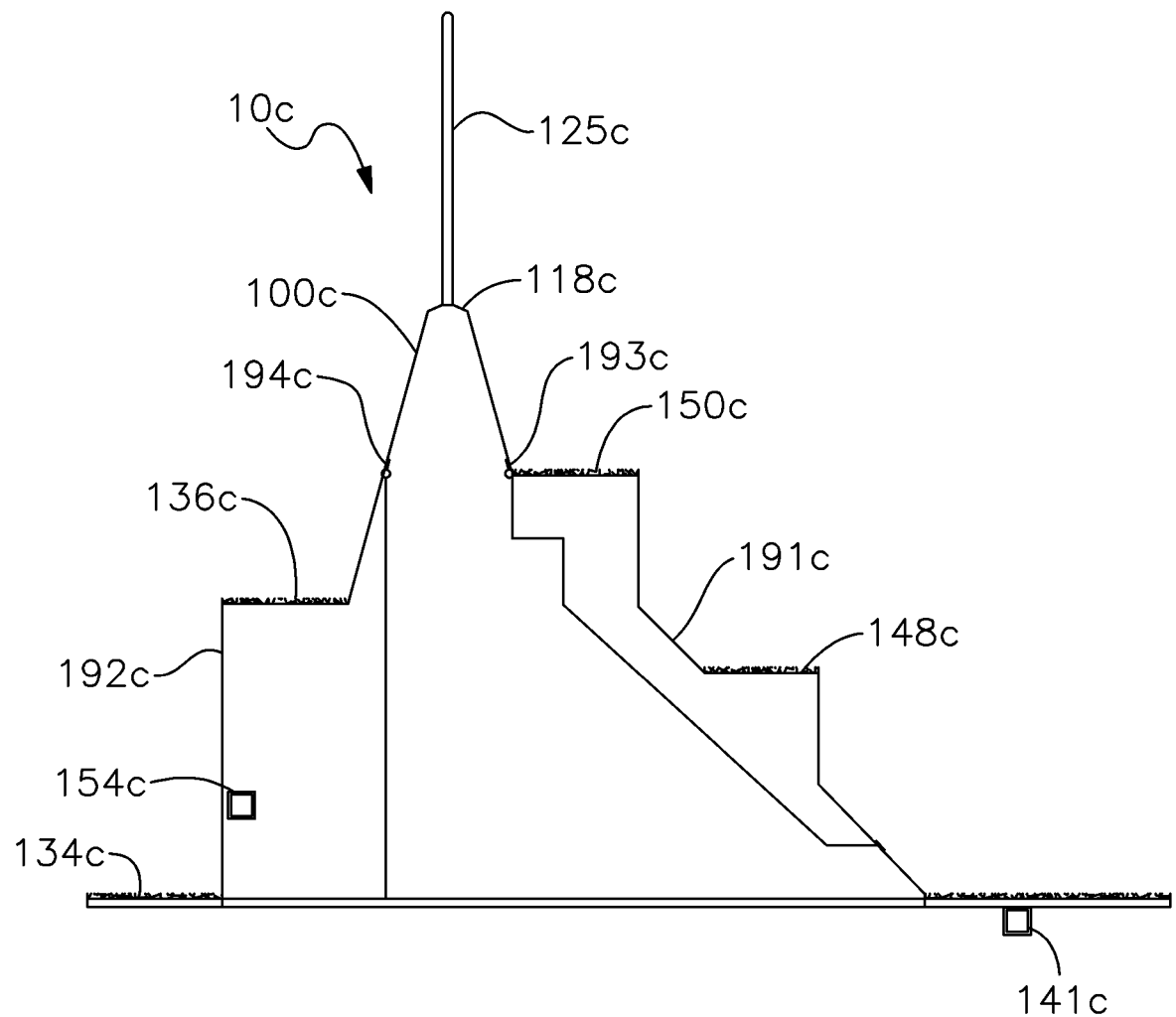
FIG. 11 is a side elevational view of an alternative version of the stairway that incorporates a fiberglass construction.

Another alternative version of the boat trailer stair system is shown in FIG. 11. In this embodiment, an underlying frame of the stair system 10c is enclosed or incorporated in a fiberglass housing 100c. A stair system may be constructed using fiberglass fabricating techniques that will be understood by persons skilled in the art. Once again, inclined forward and rearward stair sections are included for supporting the fore and aft sections of the stairway. A two-step stairway section includes a lower step 134c and intermediate step 136c. The treads of the steps are preferably carpeted. The aft section of the stairway includes a lower step 146c, an intermediate step 148c and an upper step 150c, which again may include carpeted treads. An upper apex 118c of the stairway again supports a pipe shaft handle 125c. The underlying frame diverges from top to bottom such that the steps ascend in a direction that is generally parallel to the longitudinal axis of the boat trailer. A person accessing the trailered boat is able to comfortably and securely ascend the steps generally sideways and paralleling the hull and rearwardly of the bow, which is far safer than and preferable to access provided by previous trailer ladder and step systems.

The step system 10c may again be supported by mounting tubes 141c and 154c that extend across and are fastened to the longitudinal beams of the trailer in a manner analogous to that previously described. As in the prior embodiment, the mounting tubes 141c and 154c may extend across one or both trailer beams and may interconnect opposing stairways. Typically, in any of the embodiments of this invention, stair systems employed for large trailers do not interconnect the respective rearward mounting tubes whereas smaller trailer employ a single mounting tube interconnecting the opposing stairways. The mounting tubes are in turn secured to a second analogous stairway positioned on the opposing side of the boat trailer and positioned against the opposite side of the hull of a supported vessel.

Stairway 112c also includes an optional interior compartment for storing supplies, provisions and marine/fishing gear. Access to the compartment may be provided through various access closures such as shown in FIG. 11. In one version a closure 191c may be pivotally opened along hinge 193c to lift steps 148c and 150c. An alternative closure 192c may be pivotally opened along hinge 194c to raise the upper steps 134 and 136 of the forward stair section. In the metal versions of this invention a storage compartment may be formed in the interior of the stairway and access may be provided through a door formed in either the steps or an outer wall defined by boiler plates connected to and extending between the outer stringer components. The fiberglass version may also carry running lights that are mounted at select positions on the stairway.

The present invention provides users with much more convenient access to the interior of a vessel supported on a boat trailer, particularly during launching or retrieval of the vessel. In contrast to the prior art, the steps are far more advantageously oriented such that the user is allowed to ascend and descend the steps in a sideways direction generally paralleling the trailer's longitudinal beams, as well as the longitudinal axis of the boat. The user is not required to hunt for a ladder or steps partially or fully hidden beneath the bow of the vessel. Likewise, the user does not have to search the stern area or side of the trailer for fenders or steps. Moreover, the user is not required to awkwardly and dangerously struggle over the sides a gunwale of the boat. Convenient access is provided by the three rearwardly facing steps, which allow users to step easily and safely onto and into the boat. By the same token, the forwardly facing two step side allows the boat to be loaded and unloaded in a secure and convenient manner. Additional steps may be employed to extend the stair system for deeper hull vessels. Overall, much improved access is provided for cleaning the boat, performing necessary maintenance and repairs and unloading and loading the boat while it remains on the trailer. Use of the steps is particularly advantageous at times when the vessel is being retrieved or launched. The stair system significantly reduces the risks of tripping, slipping, accidental falls and potential injury, which are experienced when conventional boat trailer ladders and steps are used.

An additional benefit provided by the stair system is that the respective handle assemblies 21 mounted to the opposing stairways 12, 12a effectively form bumpers or guides on respective sides of the supported boat B. See FIG. 4. The lateral positions of the stairways 12, 12a are adjusted by adjusting the mounting apparatuses as described above. This enables the upright handle assemblies to help guide the boat onto the conventional front roller or winch apparatus (not shown) as the vessel is loaded onto the trailer.

It should be noted that in alternative versions of this invention, various other structural components and materials may be employed for the frame sections, steps and pieces for mounting the stair system to the trailer. Pieces and parts disclosed herein may have alternative dimensions and configurations within the scope of this invention. In addition, the composition of the elements that are included in the stair system may include various types of metals and plastics suitable for use in a potentially corrosive marine environment. The system may also be constructed using assorted alternative fabrication and manufacturing techniques that will be known to persons skilled in the art. Various other numbers of steps may be employed for use with trailers and boats having different heights, configurations and dimensions.

Although specific features of the invention are shown in some of the drawings and not others this is for convenience only, as each feature may be combined with any and all of the other features in accordance with this invention.

What is claimed is:

1. A boat trailer stair system for providing persons with access to a vessel having a hull and supported on a boat trailer, said stair system comprising:
a stairway having interconnected, angularly diverging and oppositely inclined forward and rearward stair sections for positioning adjacent to the hull of the boat supported on the trailer; said stair sections being interconnected at an upper end of said stairway and having diverging lower ends; each said lower end of a respective stair section for being mounted to a longitudinal beam of the trailer at respective, longitudinally spaced apart locations on the beam;
at least one of said inclined stair sections including a plurality of steps arranged in an ascending configuration in said inclined stair section and adapted such that when said forward and rearward stair sections are mounted on the longitudinal beam of the trailer, said steps are arranged adjacent the hull of the supported vessel and ascend said inclined stair section in a direction generally paralleling the orientation of the trailer beam, the hull of the supported vessel and the longitudinal axis of the vessel supported on the trailer.

2. A boat trailer stair system comprising:
a boat trailer having a longitudinal beam and supporting a vessel thereon, which vessel includes a hull;
a generally A-frame configured stairway having interconnected and angularly diverging inclined forward and rearward stair sections for positioning adjacent to said hull of said vessel supported on said trailer, said forward and rearward frame sections being joined at an upper end of said stairway, each of said stair sections including one or more steps; and
a forward mounting apparatus attached to said stairway proximate said forward stair section for interengaging said longitudinal beam of said boat trailer to fasten the stairway to the boat trailer; and
a rearward mounting apparatus attached to said stairway proximate said rearward stair section for interengaging said longitudinal beam of said boat trailer rearwardly of the forward mounting apparatus, said forward and rearward mounting apparatuses for securing said stairway to the trailer frame such that said steps ascend said inclined stair section adjacent the hull of the trailer supported vessel in a direction generally paralleling the orientation of the trailer beam, hull of the supported vessel, and a longitudinal axis of the supported vessel.

3. The apparatus of claim 2 in which each of said forward and rearward inclined stair sections includes a spaced apart pair of inner and outer stringers and a plurality of steps extending side by side between and interconnecting each spaced apart pair of stringers, said steps being configured in an ascending pattern between said pairs of stringers.

4. The apparatus of claim 2 in which each stair section includes a plurality of steps.

5. The apparatus of claim 4 in which an upper step of said forward stair section and an upper step of said rearward stair section are unitarily interconnected to define a generally planar upper platform.

6. The apparatus of claim 2 in which a handle is attached to and extends upwardly from an apex of said stairway.

7. The apparatus of claim 2 in which filler plates are interconnected between said pairs of stringers between each said pair of adjoining steps.

8. The apparatus of claim 2 in which said forward mounting apparatus includes an elongate mounting component interconnecting said forward stair section with the longitudinal trailer beam for extending across the trailer beam.

9. The apparatus of claim 2 in which said rearward mounting apparatus includes an elongate mounting component interconnecting said forward stair section with the longitudinal trailer beam for extending across the trailer beam.

10. The apparatus of claim 2 in which said forward moving apparatus includes an elongate mounting component is longitudinally adjustable.

11. The apparatus of claim 2 in which said rearward mounting component includes an elongate rearward mounting component that is longitudinally adjustable.

12. A boat trailer stair system for providing persons with access to a vessel having a hull and mounted on a boat trailer, which boat trailer includes a pair of longitudinal trailer beams, said system comprising:
a pair of generally A-frame configured stairways, each for positioning on a respective longitudinal side of the boat trailer, each stairway including a pair of interconnected inclined and angularly diverging forward and rearward stair sections positioned adjacent to a respective side of the hull of the boat supported on the trailer, said forward and rearward stair sections being joined at an apex of the respective stairway;
forward and rearward mounting apparatuses for attaching respective said stairways to the trailer such that said stairways are supported adjacent to the trailer, each said stair section of each stairway including a plurality of steps configured in an ascending pattern from a diverging lower end of said stair section to said apex of said stairway; and
said steps of said stairway being oriented and configured to ascend said stair section adjacent the hull of the trailer in a direction generally paralleling the orientation of the trailer beam to which the stairway is mounted and the longitudinal axis of said supported vessel.

13. The apparatus of claim 12 in which the forward mounting apparatus includes an elongate component that is longitudinally adjustable to adjust the distance between the forward stair sections of said respective stairways.

14. The apparatus of claim 12 in which the rearward mounting apparatus includes an elongate component that is longitudinally adjustable to adjust the distance between the rearward stair sections of the respective stairways.

15. The apparatus of claim 12 in which each stairway carries an elongate handle assembly that extends upwardly from the stairway such that said handle assemblies guide the boat being loaded onto the trailer.

* * * * *